US009172309B2

(12) United States Patent
Jeong

(10) Patent No.: US 9,172,309 B2
(45) Date of Patent: Oct. 27, 2015

(54) SWITCHING MODE POWER SUPPLY USABLE IN AN IMAGE FORMING APPARATUS, AND IMAGE FORMING APPARATUS AND METHOD OF SUPPLYING POWER BY USING THE SAME

(71) Applicant: An-sik Jeong, Hwaseong-si (KR)

(72) Inventor: An-sik Jeong, Hwaseong-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 13/713,559

(22) Filed: Dec. 13, 2012

(65) Prior Publication Data

US 2013/0155737 A1    Jun. 20, 2013

(30) Foreign Application Priority Data

Dec. 15, 2011   (KR) .................... 10-2011-0135772
Aug. 1, 2012    (KR) .................... 10-2012-0084581

(51) Int. Cl.
*H02M 7/04*    (2006.01)
*H02M 3/335*   (2006.01)
*H02M 1/00*    (2007.01)

(52) U.S. Cl.
CPC ............ *H02M 7/04* (2013.01); *H02M 3/33507* (2013.01); *H02M 2001/0032* (2013.01); *Y02B 70/16* (2013.01)

(58) Field of Classification Search
CPC .............. H02M 3/33507; H02M 7/04; H02M 2001/0032

USPC ......... 363/78, 21.12, 21.15, 21.18, 97, 21.09, 363/21.1, 21.16, 21.13, 21.17, 21.11; 399/88

See application file for complete search history.

(56) References Cited

U.S. PATENT DOCUMENTS

| | | | |
|---|---|---|---|
| 7,505,287 B1* | 3/2009 | Kesterson .................. 363/21.01 |
| 2008/0253155 A1* | 10/2008 | Peng ............................... 363/50 |
| 2009/0189582 A1* | 7/2009 | Watanabe ..................... 323/282 |
| 2011/0242858 A1* | 10/2011 | Strzalkowski ............. 363/21.13 |
| 2011/0255311 A1* | 10/2011 | Hsu et al. .................... 363/21.15 |
| 2011/0311260 A1* | 12/2011 | Nakajima et al. .............. 399/88 |
| 2012/0140530 A1* | 6/2012 | Nemoto ..................... 363/21.12 |
| 2013/0121031 A1* | 5/2013 | Sims ............................... 363/15 |

* cited by examiner

*Primary Examiner* — Matthew Nguyen
*Assistant Examiner* — Trinh Dang
(74) *Attorney, Agent, or Firm* — Staas & Halsey LLP

(57) ABSTRACT

A switching mode power supply and a method of supplying power by using the same. The switching mode power supply includes a converting unit to convert an alternating current (AC) voltage input to the switching mode power supply to at least one direct current (DC) voltage by using at least one transformer, and a voltage controller to control a voltage level of an output voltage to be output to a system controller of the image forming apparatus from among the at least one DC voltage, where the system controller controls operations of the image forming apparatus. The voltage controller includes a switching unit to switch the voltage level of the output voltage from a first voltage level to a second voltage level when the image forming apparatus enters a power saving mode, where the second voltage level is lower than the first voltage level.

26 Claims, 9 Drawing Sheets

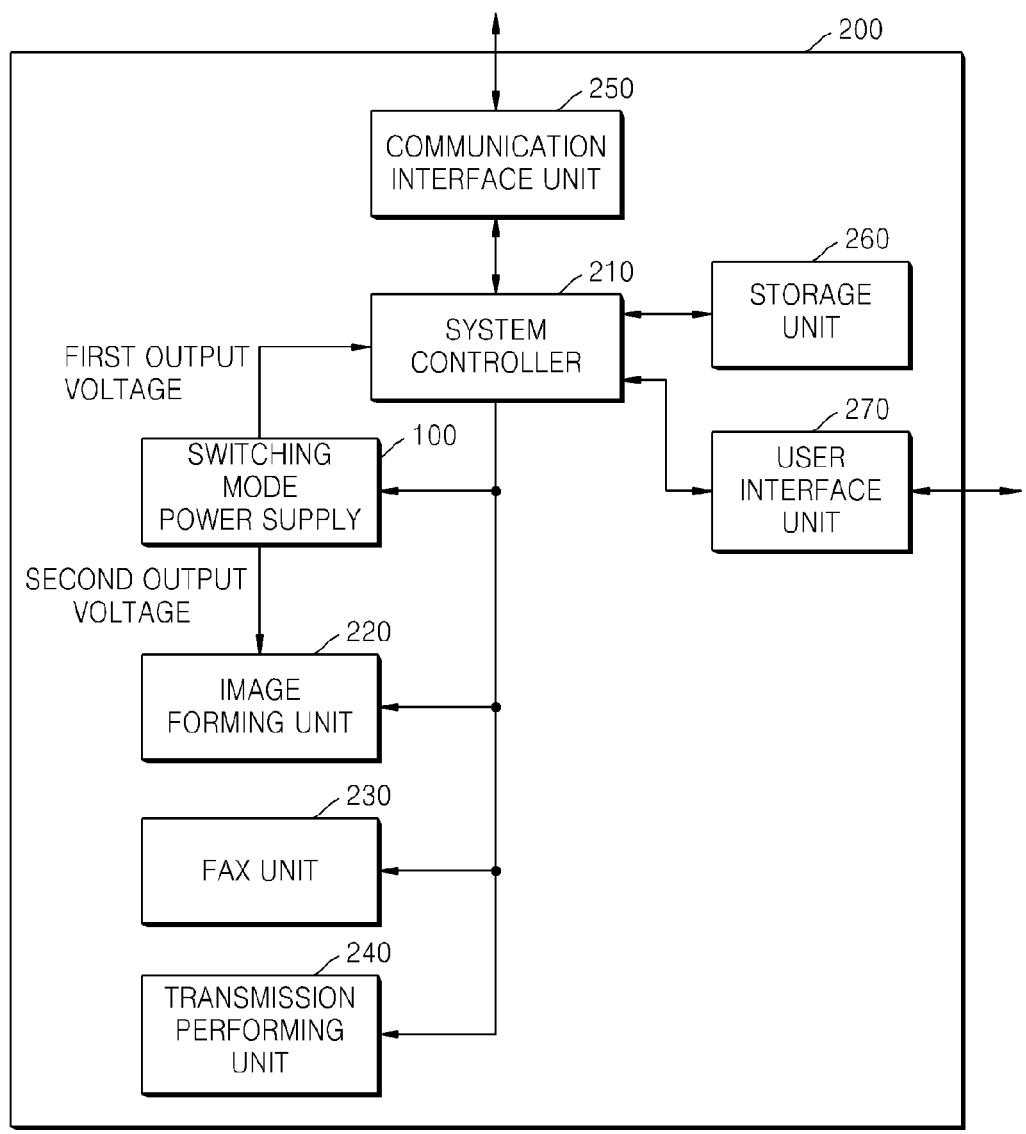

SWITCHING MODE POWER SUPPLY USABLE IN AN IMAGE FORMING APPARATUS, AND IMAGE FORMING APPARATUS AND METHOD OF SUPPLYING POWER BY USING THE SAME

CROSS-REFERENCE TO RELATED APPLICATIONS

This application claims priority under 35 U.S.C. §119 from Korean Patent Application No. 10-2011-0135772, filed on Dec. 15, 2011, and Korean Patent Application No. 10-2012-0084581, filed on Aug. 1, 2012, in the Korean Intellectual Property Office, the disclosures of which are incorporated herein by reference in their entireties.

BACKGROUND

1. Field

The present general inventive concept relates to a switching mode power supply, a method of supplying power by using the same, and an image forming apparatus.

2. Description of the Related Art

A switching mode power supply (SMPS) may be used to supply power to electronic products. The switching mode power supply converts an input alternating current (AC) voltage to a constant voltage to operate electronic products. When an electronic product is in a standby state for a predetermined period of time or longer, the electronic product enters a power saving mode. Since some functions of the electronic product should operate even in the power saving mode, operation of a power supply is not completely stopped. Recently, regulations have been reinforced on standby power of electronic products to reduce carbon dioxide emissions all over the world. Accordingly, there is a need to develop a method of reducing power consumption in a power supply in the power saving mode.

SUMMARY

The present general inventive concept provides a switching mode power supply (SMPS), a method of supplying power by using the same, and an image forming apparatus.

The present general inventive concept also provides a computer readable recording medium having recorded thereon a computer program to execute the method.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a switching mode power supply of an image forming apparatus, the switching mode power supply including a converting unit to convert an alternating current (AC) voltage input to the switching mode power supply to at least one direct current (DC) voltage by using at least one transformer, and a voltage controller to control a voltage level of an output voltage to be output to a system controller of the image forming apparatus from among the at least one DC voltage, where the system controller controls operations of the image forming apparatus, wherein the voltage controller includes a switching unit to switch the voltage level of the output voltage from a first voltage level to a second voltage level when the image forming apparatus enters a power saving mode, where the second voltage level is lower than the first voltage level.

The switching unit may switch the voltage level of the output voltage, based on a control signal received from the system controller.

The voltage controller may be connected to a secondary coil of the at least one transformer so as to control the voltage level of the output voltage.

The voltage controller may further include a voltage stabilizer including a voltage regulator connected in parallel to an output terminal to output the output voltage, and at least one resistor connected to a reference voltage terminal of the voltage regulator, wherein the switching unit is connected to the reference voltage terminal of the voltage regulator, and wherein the switching unit includes a diode that is turned on or off based on a voltage of a control signal received from the system controller; and at least one resistor connected in series to the diode.

The switching unit may be turned on to switch the voltage level of the output voltage to the second voltage level, based on the control signal received from the system controller, when the image forming apparatus enters the power saving mode.

The second voltage level may be determined according to a resistance value of the at least one resistor.

The at least one resistor may be a variable resistor, and wherein the system controller determines the resistance value of the variable resistor as a resistance value to minimize power consumption in the power saving mode from among resistance values of the variable resistor.

The second voltage level may be determined according to a voltage level of the voltage of the control signal, and wherein the voltage level of the control signal may be a voltage value converted by a digital-analog converter of the system controller.

The system controller may determine the voltage level of the control signal as a voltage value to minimize power consumption in the power saving mode from among voltage values converted by the digital-analog converter.

The voltage controller may further include a voltage stabilizer including a voltage regulator connected in parallel to an output terminal to output the output voltage, and at least one resistor connected to a reference voltage terminal of the voltage regulator, and wherein the switching unit may include a transistor that is turned on or off based on a control signal received from the system controller.

The switching unit may be connected in parallel to the at least one resistor connected between the reference voltage terminal of the voltage regulator and the output terminal.

The switching unit may be turned on to switch the voltage level of the output voltage to the second voltage level, according to a control signal received from the system controller, when the image forming apparatus enters the power saving mode.

The switching unit may be connected in parallel to at least one series resistor connected between the reference voltage terminal of the voltage regulator and ground.

The switching unit may be turned off to switch the voltage level of the output voltage to the second voltage level, based on a control signal received from the system controller, when the image forming apparatus enters the power saving mode.

The converting unit may convert the AC voltage input to the switching mode power supply to a DC voltage and then may output the DC voltage as the output voltage, and the output voltage may be output to the image forming apparatus, including the system controller.

The converting unit may convert the AC voltage input to the switching mode power supply to a first output voltage and a second output voltage, wherein the voltage controller controls a voltage level of the first output voltage, and may switch the voltage level of the first output voltage from the first voltage level to the second voltage level when the image forming apparatus enters the power saving mode, and the first output voltage and the second output voltage may be output to the system controller and an image forming unit of the image forming apparatus, respectively.

The foregoing and/or other features and utilities of the present general inventive concept may also be achieved by providing an image forming apparatus which includes a switching mode power supply, the image forming apparatus including a system controller to control operations of the image forming apparatus, and to output a control signal to control a switching operation of the switching mode power supply according to whether the image forming apparatus is in an operating mode or a power saving mode, and the switching mode power supply to convert an alternating current (AC) voltage input thereto to at least one direct current (DC) voltage by using at least one transformer, to switch a voltage level of an output voltage, which is output to the system controller from among the at least one DC voltage, to a first voltage level or a second voltage level according to the control signal, and then to output the switched output voltage to the system controller, where the second voltage level is lower than the first voltage level.

When the image forming apparatus enters the power saving mode, the switching mode power supply may switch the voltage level of the output voltage from the first voltage level to the second voltage level.

The switching mode power supply may include a voltage stabilizer to stabilize the output voltage by using a voltage regulator connected in parallel to an output terminal to output the output voltage, and at least one resistor connected between a reference voltage terminal of the voltage regulator and the output terminal and a switching unit including a transistor connected in parallel to the at least one resistor, wherein, when the image forming apparatus enters the power saving mode, the switching unit turns on the transistor to switch the voltage level of the output voltage to the second voltage level, based on the control signal.

The switching mode power supply may include a voltage stabilizer to stabilize the output voltage by using a voltage regulator connected in parallel to an output terminal to output the output voltage, and at least one resistor connected between a reference voltage terminal of the voltage regulator and ground, and a switching unit including a transistor connected in parallel to the at least one resistor, wherein, when the image forming apparatus enters the power saving mode, the switching unit turns off the transistor to switch the voltage level of the output voltage to the second voltage level, based on the control signal.

The switching mode power supply may include a voltage stabilizer to stabilize the output voltage by using a voltage regulator connected in parallel to an output terminal to output the output voltage, and at least one resistor connected between a reference voltage terminal of the voltage regulator and the output terminal, and a switching unit including a diode connected to the reference voltage terminal of the voltage regulator, and a resistor connected in series to the diode, wherein the switching unit is connected to the reference voltage terminal of the voltage regulator, and wherein the switching unit turns on the diode to switch the voltage level of the output voltage to the second voltage level, based on the control signal, when the image forming apparatus enters the power saving mode.

The foregoing and/or other features and utilities of the present general inventive concept may also be achieved by providing a method of supplying power to an image forming apparatus by using a switching mode power supply, the method including converting an alternating current (AC) voltage input to the switching mode power supply into at least one direct current (DC) voltage by using at least one transformer, receiving a control signal to control a switching operation of the switching mode power supply according to whether the image forming apparatus is in an operating mode or a power saving mode, from a system controller that controls operations of the image forming apparatus, switching a voltage level of an output voltage, which is output to the system controller from among the at least one DC voltage, to a first voltage level or a second voltage level, based on the control signal, where the second voltage level is lower than the first voltage level, and outputting the switched output voltage to the system controller.

The switching of the voltage level may include switching the voltage level of the output voltage from the first voltage level to the second voltage level when the image forming apparatus enters the power saving mode.

The method may further include stabilizing the output voltage by using a voltage regulator and at least one series resistor, where the voltage regulator is connected in parallel to an output terminal to output the output voltage and the at least one series resistor is connected between a reference voltage terminal of the voltage regulator and the output terminal, and wherein the switching of the voltage level includes switching the voltage level of the output voltage by using a transistor connected in parallel to the at least one series resistor, and turning on the transistor to switch the voltage level of the output voltage to the second voltage level, based on the control signal, when the image forming apparatus enters the power saving mode.

The method may further include stabilizing the output voltage by using a voltage regulator and at least one series resistor, where the voltage regulator is connected in parallel to an output terminal to output to output the output voltage and the at least one series resistor is connected between a reference voltage terminal of the voltage regulator and ground, and wherein the switching of the voltage level includes switching the voltage level of the output voltage by using a transistor connected in parallel to the at least one series resistor, and turning off the transistor to switch the voltage level of the output voltage to the second voltage level, based on the control signal, when the image forming apparatus enters the power saving mode.

The method may further include stabilizing the output voltage by using a voltage regulator and at least one series resistor, where the voltage regulator is connected in parallel to an output terminal to output for outputting the output voltage and the at least one series resistor is connected between a reference voltage terminal of the voltage regulator and ground, and wherein the switching of the voltage level includes switching the voltage level of the output voltage by using a diode connected to the reference voltage terminal of the voltage regulator; and a resistor connected in series to the diode, and turning off the diode to switch the voltage level of the output voltage to the second voltage level, based on the control signal, when the image forming apparatus enters the power saving mode.

The foregoing and/or other features and utilities of the present general inventive concept may also be achieved by providing a computer readable recording medium having embodied thereon a computer program to execute a method of supplying power to an image forming apparatus by using a switching mode power supply, wherein the method includes converting an alternating current (AC) voltage input to the switching mode power supply into at least one direct current (DC) voltage by using at least one transformer, receiving a control signal to control a switching operation of the switching mode power supply according to whether the image forming apparatus is in an operating mode or a power saving mode, from a system controller that controls operations of the image forming apparatus, switching a voltage level of an output voltage, which is output to the system controller from among the at least one DC voltage, to a first voltage level or a second voltage level, based on the control signal, where the second voltage level is lower than the first voltage level, and outputting the switched output voltage to the system controller.

BRIEF DESCRIPTION OF THE DRAWINGS

The above and other features and utilities of the present general inventive concept will become more apparent by describing in detail exemplary embodiments thereof with reference to the attached drawings in which:

These and/or other features and utilities of the present general inventive concept will become apparent and more readily appreciated from the following description of the embodiments, taken in conjunction with the accompanying drawings of which:

FIG. 5 is a block diagram of an image forming apparatus with an SMPS, according to an exemplary embodiment of the present general inventive concept.

DETAILED DESCRIPTION OF THE PREFERRED EMBODIMENTS

Figure 1:
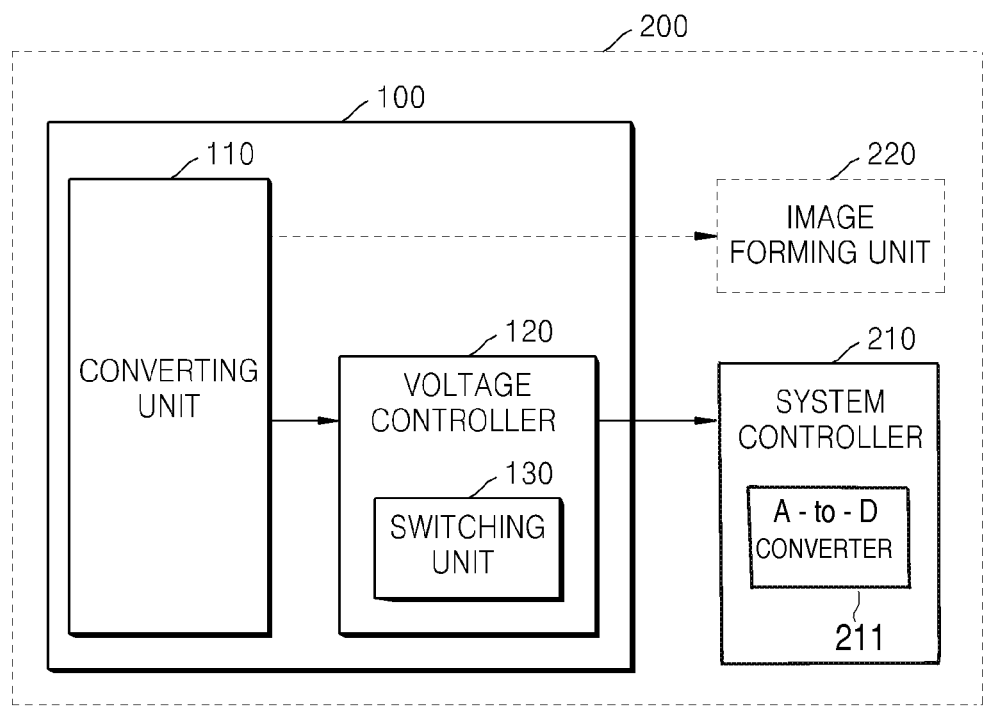
FIG. 1 is a block diagram of a switching mode power supply (SMPS) according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram of a switching mode power supply (SMPS) 100 according to an exemplary embodiment of the present general inventive concept. Referring to FIG. 1, the SMPS 100 includes a converting unit 110 and a voltage controller 120. The voltage controller 120 includes a switching unit 130.

FIG. 1 illustrates selected main components of the SMPS 100 related to the current exemplary embodiment. However, the SMPS 100 of FIG. 1 may further include other general components.

The SMPS 100 of FIG. 1 is a type of power supply that may be used in an image forming apparatus, but is not limited thereto. As such, the SMPS 100 may be used to supply power to, for example, an image reading apparatus, a multi-function peripheral (MFP), a personal computer (PC), a facsimile, a television (TV), etc.

An image forming apparatus 200 to which power is supplied using the SMPS 100 may include a system controller 210 that controls overall operations of the image forming apparatus 200, and an image forming unit 220 that forms an image.

The converting unit 110 converts an AC voltage input to the SMPS 100 to at least one DC voltage by using at least one transformer. In other words, the converting unit 110 rectifies an AC voltage. The rectified voltage is switched, and is input to the at least one transformer and then converted to at least one DC voltage.

More specifically, the converting unit 110 may include a rectifier device (not illustrated) that rectifies an AC voltage and a smoothing unit (not illustrated) to smooth the rectified voltage. According to an embodiment of the present general inventive concept, the rectifier device may be a bridge circuit using one or more diodes, and the smoothing device may be a capacitor, but the present general inventive concept is not limited thereto.

The converting unit 110 may further include a switching controller (not illustrated) to control switching to apply the rectified voltage to a transformer. According to the current exemplary embodiment, the switching controller may be a pulse-width modulation (PWM) integrated circuit (IC), but is not limited thereto.

The converting unit 110 may further include at least one transformer (not illustrated) to convert a switched voltage to an output voltage of the SMPS 100. The transformer may deliver electrical energy from one circuit to another circuit by using coil induction. Thus, in the transformer, electrical energy applied to a primary coil may be delivered to a secondary coil.

The transformer may convert a primary coil voltage to a secondary coil voltage, based on a coil winding ratio. Thus, the SMPS 100 applies a voltage to operate the image forming apparatus 200, based on the second coil voltage generated by the transformer. As described above, a voltage output from the SMPS 100 is applied to elements of the image forming apparatus 200, thus operating the image forming apparatus 200.

Exemplary embodiments of the present general inventive concept that include the SMPS 100 outputting a single voltage to the image forming apparatus 200 are referred to as "single-output," and exemplary embodiments of the present general inventive concept that include SMPS 100 outputting a plurality of voltages to the image forming apparatus 200 are referred to as "multi-output."

In a multi-output, a coil winding form on a transformer may be adjusted to convert a primary coil voltage to a plurality of secondary coil voltages. Otherwise, a plurality of transformers may convert the same primary coil voltage to the plurality of secondary coil voltages according to a number of times of winding coil thereon.

According to an exemplary embodiment of the present general inventive concept, the converting unit 110 may output at least one DC voltage according to a single-output or a multi-output, and may output at least one DC voltage by using a plurality of transformers.

Hereinafter, it is assumed that a multi-output indicates that outputting two DC voltages, but the present general inventive concept is not limited thereto.

Referring to FIG. 1, for a single-output, the converting unit 110 may output a DC voltage by using a transformer. For example, the converting unit 110 may output a DC voltage of 24 V.

Thus, the SMPS 100 applies the DC voltage of 24 V to the image forming apparatus 200 to allow the image forming apparatus 200 to form an image and to control an operation of the image forming apparatus 200 by using the DC voltage of 24 V. For example, the image forming apparatus 200 may be supplied with 24 V, convert the 24 V to DC voltages for elements of the image forming apparatus 200 by using a DC/DC converter, and apply the DC voltage to the elements. When the system controller 210 that controls overall operations of the image forming apparatus 200 is driven with 3.3 V, the image forming apparatus 200 may convert 24 V to 3.3 V by using the DC/DC converter, and apply the 3.3 V to the system controller 210.

According to another exemplary embodiment of the present general inventive concept, for a multi-output, the converting unit 110 may output a plurality of DC voltages by using the at least one transformer. For example, the converting unit 110 may output DC voltages of 5 V and 24 V. Thus, the SMPS 100 applies the DC voltages of 5 V and 24 V to the image forming apparatus 200.

According to the current exemplary embodiment, the DC voltage of 5 V may be used to drive the system controller 210 that controls overall operations of the image forming apparatus 200, and the DC voltage of 24 V may be used to drive the image forming unit 220 that forms an image.

It may be assumed that for a multi-output, a voltage applied to the system controller 210 to control overall operations of the image forming apparatus 200 is a first output voltage, and a voltage applied to the image forming unit 220 to form an image is a second output voltage.

As described above, for a single-output or a multi-output, the converting unit 110 is capable of outputting at least one DC voltage by using at least one transformer.

The voltage controller 120 controls a voltage level of an output voltage to be output to the system controller 210 from among the at least one DC voltage. In other words, the voltage controller 120 determines a voltage level of an output voltage to be applied to the system controller 210. Also, the voltage controller 120 controls the voltage level of the output voltage to output a constant and stable output voltage.

For example, if the SMPS 100 is set to output a first voltage level to the system controller 210, then the voltage controller 120 reduces the voltage level of the output voltage to be equal to the first voltage level when the voltage level of the output voltage is greater than the first voltage level, and increases the voltage level of the output voltage to be equal to the first voltage level when the voltage level of the output voltage is less than the first voltage level.

More specifically, the voltage controller 120 controls an amount of current to be supplied to a photo coupler (not illustrated) according to a voltage level of an output voltage that is a secondary coil voltage of the at least one transformer. A light emitting unit of the photo coupler is connected in series to the voltage controller 120 to be connected to a secondary coil of the at least one transformer, and a light receiving unit of the photo coupler is connected to the switching controller connected to a primary coil of the at least one transformer to control switching of a voltage of the primary coil. Thus, the voltage controller 120 may maintain the voltage level of the output voltage constant by controlling the amount of current fed back to the primary coil of the at least one transformer via the photo coupler, based on the voltage level of the output voltage.

According to an exemplary embodiment of the present general inventive concept, the voltage controller 120 may include, for example, a voltage regulator, but the present general inventive concept is not limited thereto. For example, the voltage controller 120 may control the voltage level of the output voltage to be maintained at a constant level by using the voltage regulator.

When the image forming apparatus 200 enters a power saving mode, the switching unit 130 switches the voltage level of the output voltage from the first voltage level to the second voltage level that is lower than the first voltage level. Thus, according to operations of the switching unit 130, the voltage controller 120 outputs the output voltage whose voltage level is equal to the first voltage level or the second voltage level. For example, when the voltage level of the output voltage is switched to the second voltage level by the switching unit 130, the voltage controller 120 controls the voltage level of the output voltage to output a constant voltage of the second voltage level.

The power saving mode indicates a state in which only some elements of the image forming apparatus 200 are activated. For example, if the image forming apparatus 200 is in the power saving mode, only the system controller 210 of the image forming apparatus 200 may normally operate and power is not supplied to the other elements thereof.

Thus, in the power saving mode, if the image forming apparatus 200 does not perform any operation for a predetermined time or longer, the SMPS 100 controls power not to be supplied to all elements of the image forming apparatus 200, except for the system controller 210, thereby reducing power consumption in the image forming apparatus 200. The power saving mode may also be referred to as a sleep mode.

In contrast, an operating mode indicates a state in which the image forming apparatus 200 performs, for example, an operation of forming an image or standing by to perform the operation. In other words, in the operating mode, the image forming apparatus 200 performs an operation, or stands by to perform an operation immediately after the image forming apparatus 200 receives a signal to instruct to perform the operation.

Thus, if the image forming apparatus 200 is in the operating mode, power is supplied to all the elements of the image forming apparatus 200, including the system controller 210, and all the elements within the image forming apparatus operate normally.

In the SMPS 100 according to an exemplary embodiment of the present general inventive concept, when the image forming apparatus 200 is in the power saving mode, the SMPS 100 controls power to be supplied to only the system controller 210 and not to be supplied to the other elements, including the image forming unit 220, by using a switching device, etc., but is not limited thereto.

For example, with regard to a multi-output, the SMPS 100 cuts off a voltage supply of 24 V to the image forming unit 220 so that the SMPS 100 only supplies 5 V to be output to the system controller 210.

In the SMPS 100 according to an exemplary embodiment of the present general inventive concept, when the image forming apparatus 200 enters the power saving mode, an output voltage that is to be output to the system controller 210 is switched to the second voltage level that is lower than the first voltage level. Thus, in the power saving mode, the SMPS 100 controls a voltage that is lower than a voltage to be output to the system controller 210 in the operating mode to be output to the system controller 210.

In other words, the first voltage level is output to the system controller 210 when the image forming apparatus 200 is in the operating mode. The second voltage level is output to the system controller 210 when the image forming apparatus 200 is in the power saving mode.

For example, with regard to a single-output, the first voltage level may be 24 V and the second voltage level may be 21.6 V. Thus, the SMPS 100 outputs 24 V to the system controller 210 in the operating mode but outputs 21.6 V, which is lower, to the system controller 210 in the power saving mode.

Accordingly, as compared to when the SMPS 100 outputs 24 V in the operating mode and the power saving mode, power consumption in the image forming apparatus 200 may be reduced by about 5% because the SMPS 100 outputs 21.6 V in the power saving mode, which is lower than the output voltage of the SMPS 100 in the operating mode.

Also, when the image forming apparatus 200 converts a voltage supplied from the SMPS 100 to a voltage, e.g., 3.3 V, to drive the system controller 210 by using the DC/DC converter, the DC/DC converter receives 21.6 V rather than 24 V and converts the 21.6 V to 3.3 V. Thus, a power loss, caused by the voltage conversion may be reduced by improving the conversion efficiency of the DC/DC converter.

With regard to a multi-output, a first voltage level and a second voltage level of a first output voltage that is to be output to the system controller 210 may be 5 V and 4 V, respectively. Thus, the SMPS 100 outputs 5 V to the system controller 210 when the image forming apparatus 200 is in the operating mode, and outputs 4 V, which is lower, to the system controller 210 when the image forming apparatus 200 is in the power saving mode.

With regard to a multi-output, a DC voltage that is not used in the power saving mode is blocked from among DC voltages generated by the at least one transformer, thereby reducing power consumption. When the image forming apparatus 200 enters the power saving mode, the SMPS 100 may reduce an output voltage to be output to the system controller 210 to a lower voltage than in the operating mode, thereby more effectively reducing power consumption in the image forming apparatus 200.

The second voltage level of the output voltage that is output when the image forming apparatus 200 enters the power saving mode may be a minimum voltage level permitted to operate the image forming apparatus 200 in the power saving mode. Thus, the second voltage level may be lowered to be equal to the minimum voltage level, thereby minimizing power consumption of the image forming apparatus 200 in the power saving mode.

According to an exemplary embodiment of the present general inventive concept, the switching unit 130 may switch a voltage level of an output voltage to be output to the system controller 210, based on a control signal received from the system controller 210.

The system controller 210 sends the control signal to the switching unit 130 to turn on and/or off the switching unit 130 according to the control signal. Thus, the voltage level of the output voltage that is to be output to the system controller 210 is switched to the first voltage level or the second voltage level.

For example, upon receiving a control signal indicating that the image forming apparatus 200 enters the power saving mode from the system controller 210, the switching unit 130 may be turned on to switch the voltage level of the output voltage from the first voltage level to the second voltage level.

Alternatively, upon receiving a control signal indicating that the image forming apparatus 200 enters the power saving mode from the system controller 210, the switching unit 130 may be turned off to switch the voltage level of the output voltage from the first voltage level to the second voltage level.

If the image forming apparatus 200 switches back from the power saving mode to the operating mode, the switching unit 130 may receive a control signal indicating that the image forming apparatus 200 enters the operating mode from the system controller 210, and may switch the voltage level of the output voltage from the second voltage level to the first voltage level.

According to an exemplary embodiment of the present general inventive concept, the SMPS 100 outputs a lower output voltage to the system controller 210 when the image forming apparatus 200 is in the power saving mode than when the image forming apparatus 200 is in the operating mode.

Thus, the SMPS 100 according to the current embodiment not only blocks a DC voltage that is not used in the power saving mode but also reduces an output voltage, which is to be output to the system controller 210, to a minimum voltage level that is required to operate the image forming apparatus 200 in the power saving mode, thereby more effectively reducing power consumption of the image forming apparatus 200.

Figure 2A:
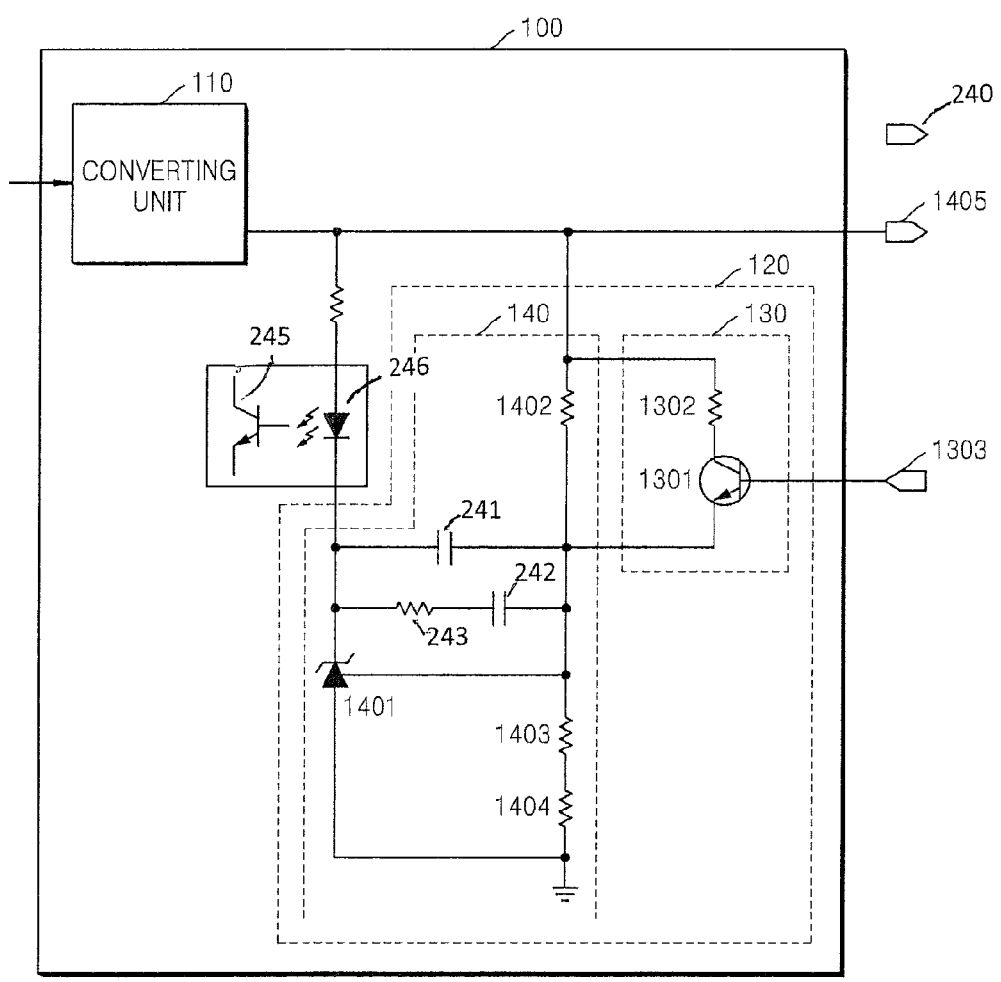
FIG. 2A is a circuit diagram of a voltage controller of FIG. 1, according to an exemplary embodiment of the present general inventive concept.

FIG. 2A is a circuit diagram of the voltage controller 120 of FIG. 1, according to an exemplary embodiment of the present general inventive concept. Referring to FIG. 2A, the voltage controller 120 includes the switching unit 130 and a voltage stabilizer 140. The switching unit 130 includes a transistor 1301 and a resistor A 1302. The voltage stabilizer 140 includes a voltage regulator 1401, a first resistor 1402, a second resistor 1403, and a third resistor 1404. The switching unit 130 may further include an input terminal 1303 to receive a signal indicating a state of the image forming apparatus 200. The voltage stabilizer 140 may further include an output terminal 1405 to output an output voltage to the system controller 210. FIG. 2A also illustrates a terminal 240, capacitors 241, 242, resistors 243, 244, transistor 245, and diode 246.

FIG. 2A illustrates selected components of the voltage controller 120 related to the current exemplary embodiment. However, the voltage controller 120 may further include other general components.

Also, operating principles of the circuit of FIG. 2A will be obvious to those of ordinary skill in the art, based on the above description with reference to FIG. 1 and will thus not be described here.

The voltage controller 120 includes the switching unit 130 and the voltage stabilizer 140, and outputs an output voltage controlled using the switching unit 130 and the voltage stabilizer 140.

The voltage stabilizer 140 is connected to a secondary coil of a transformer, and controls the voltage level of the output voltage to be maintained at a constant level. Referring to FIG. 2A, the voltage stabilizer 140 includes the voltage regulator 1401, the first resistor 1402, the second resistor 1403, and the third resistor 1404.

According to an exemplary embodiment of the present general inventive concept, the voltage regulator 1401 may be a three-terminal device, and is connected in parallel to the output terminal 1405. An amount of current flowing between the other two terminals, i.e., a cathode and an anode, of the voltage regulator 1401 changes according to a voltage value of a reference voltage terminal of the voltage regulator 1401. The voltage regulator 1401 according to the current exemplary embodiment may be embodied as a device, TL431, but is not limited thereto, and may be embodied as various other devices, for example, an operational amplifier.

At least one resistor may be connected between the output terminal 1405 and ground with respect to the reference voltage terminal of the voltage regulator 1401. According to an exemplary embodiment of the present general inventive concept, the first resistor 1402 is connected between the reference voltage terminal of the voltage regulator 1401 and the output terminal 1405, and the second resistor 1403 and the third resistor 1404 are connected between the reference voltage terminal of the voltage regulator 1401 and ground.

The voltage level of the output voltage to be output via the output terminal 1405 is determined according to operations of the first to third resistors 1402 to 1404 connected to the reference voltage terminal of the voltage regulator 1401. For example, when the SMPS 100 is determined to output the first voltage level of the output voltage, resistance values of the first to third resistors 1402 to 1404 may be determined in such a manner that the output voltage output from the SMPS 100 via the output terminal 1405 may be equal to the first voltage level. Thus, the voltage regulator 1401 controls the voltage level of the output voltage to be equal to the first voltage level.

The switching unit 130 switches the voltage level of the output voltage to the first voltage level or a second voltage level, based on a control signal received from the system controller 210. Referring to FIG. 2A, the switching unit 130 may include the transistor 1301 and the resistor A 1302.

According to an exemplary embodiment of the present general inventive concept, the transistor 1301 may be an NPN transistor or a PNP transistor. In the current exemplary embodiment, the switching unit 130 uses a bipolar junction transistor (BJT) as a switching device, but the present general inventive concept is not limited thereto and a field effect transistor (FET) or a semiconductor switch may be used as a switching device.

According to an exemplary embodiment of the present general inventive concept, the switching unit 130 receives the control signal from the system controller 210 via the input terminal 1303. This control signal indicates whether the image forming apparatus 200 is in the operating mode or the power saving mode.

The transistor 1301 of the switching unit 130 is turned on and/or off according to the control signal. In this case, the transistor 1301 may be an NPN transistor or a PNP transistor. The NPN transistor is turned on when the control signal input thereto via the input terminal 1303 is logic high, and the PNP transistor is turned on when the control signal input thereto via the input terminal 1303 is logic low.

Thus, a logic state of the control signal when the switching unit 130 uses the NPN transistor may be opposite to when the switching unit 130 uses the PNP transistor. For example, if the control signal input to the switching unit 130 using the NPN transistor is logic low in the operating mode and is logic high in the power saving mode, then the control signal input to the switching unit 130 using the PNP transistor may be logic high in the operating mode and be logic low in the power saving mode.

According to an exemplary embodiment of the present general inventive concept, the transistor 1301 may be connected in parallel to at least one resistor connected between the reference voltage terminal of the voltage regulator 1401 and the output terminal 1405.

Referring to FIG. 2A, the switching unit 130 including the transistor 1301 and the resistor A 1302 is connected in parallel to the first resistor 1402 connected between the reference voltage terminal of the voltage regulator 1401 and the output terminal 1405.

If the switching unit 130 receives the control signal indicating that the image forming apparatus 200 is in the power saving mode (i.e., the control signal is logic high when the NPN transistor is used and is logic low when the PNP transistor is used), then the transistor 1301 is turned on.

When the transistor 1301 is turned on, current flows to the resistor A 1302. Then, the first resistor 1402 and the resistor A 1302 become a parallel connection. Thus, a total resistance value between the output terminal 1405 and the reference voltage terminal of the voltage regulator 1401 is lowered, and an amount of current flowing from the output terminal 1405 to the reference voltage terminal of the voltage regulator 1401 increases. Accordingly, the voltage level of the output voltage output via the output terminal 1405 is lowered.

As described above, when the image forming apparatus 200 enters the power saving mode, the transistor 1301 is turned on and/or off based on the control signal, thereby switching the voltage level of the output voltage from the first voltage level to the second voltage level that is lower than the first voltage level.

If the image forming apparatus 200 is in the operating mode, then the switching unit 130 receives the control signal indicating that the image forming apparatus 200 is in the operating mode (the control signal is logic low when the NPN transistor is used and is logic high when the PNP transistor is used), and then the transistor 1301 is turned off. When the transistor 1301 is turned off, no current flows through the resistor A 1302, and thus, the voltage level of the output voltage is switched back from the second voltage level to the first voltage level.

According to an exemplary embodiment of the present general inventive concept, when the image forming apparatus 200 enters the power saving mode, the transistor 1301 is turned on and the switching unit 130 switches the voltage level of the output voltage from the first voltage level to the second voltage level. In other words, when the image forming apparatus 200 is in the power saving mode, the SMPS 100 outputs an output voltage whose voltage level is lower than in the operating mode. Thus, the SMPS 100 may output a minimum voltage level required to control the image forming apparatus 200 in the power saving mode, as an output voltage. Accordingly, the SMPS 100 according to the current exemplary embodiment may more effectively reduce power consumption in the image forming apparatus 200.

Figure 2B:
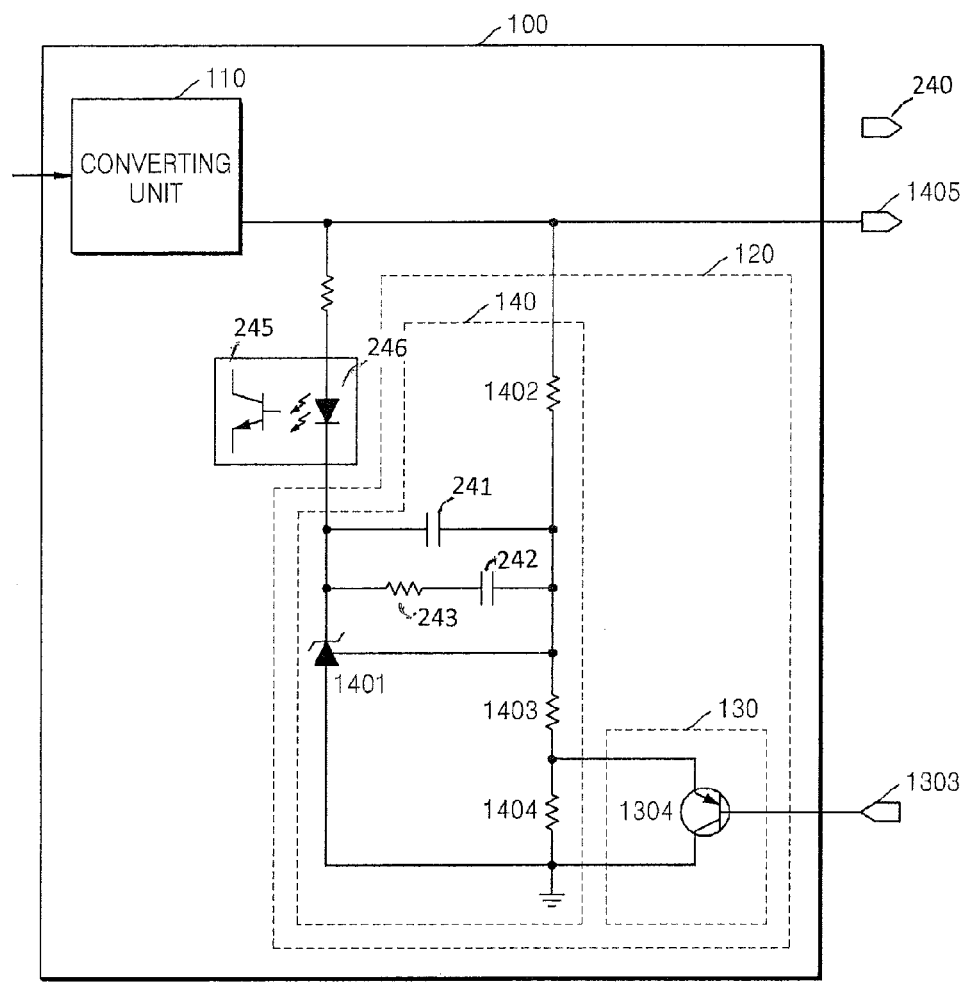
FIG. 2B is a circuit diagram of the voltage controller of FIG. 1, according to another exemplary embodiment of the present general inventive concept.

FIG. 2B is a circuit diagram of the voltage controller 120 of FIG. 1, according to another exemplary embodiment of the present general inventive concept. The voltage controller 120 illustrated in FIG. 2B is the same as the voltage controller 120 illustrated in FIG. 2A, except for a structure of the switching unit 130. Referring to FIG. 2B, the switching unit 130 includes a transistor 1304. As compared to the switching unit 130 of FIG. 2A, the switching unit 130 of FIG. 2B is disposed at a different location. FIG. 2B also illustrates a terminal 240, capacitors 241, 242, resistors 243, 244, transistor 245, and diode 246.

According to an exemplary embodiment of the present general inventive concept, the transistor 1304 may be connected in parallel to at least one resistor connected between a reference voltage terminal of a voltage regulator 1401 and ground.

Referring to FIG. 2B, the switching unit 130 including the transistor 1304 is connected in parallel to a third resistor 1404 between the reference voltage terminal of the voltage regulator 1401 and ground.

According to the current exemplary embodiment, if the switching unit 130 receives a control signal indicating that the image forming apparatus 200 is in the operating mode (i.e., the control signal is logic high when the transistor 1304 is an NPN transistor and is logic low when the transistor 1304 is a PNP transistor), then the transistor 1304 is turned on. When the transistor 1304 is turned on, current flowing through the third resistor 1404 is bypassed to the transistor 1304 and no current flows through the third resistor 1404.

If the image forming apparatus 200 enters the power saving mode, then the switching unit 130 receives a control signal indicating that the image forming apparatus 200 is in the power saving mode (the control signal is logic low when the transistor 1304 is an NPN transistor and is logic high when the transistor 1304 is a PNP transistor), then the transistor 1304 is turned off. When the transistor 1304 is turned off, no current flows through the transistor 1304 and current flows through the third resistor 1404, unlike in the operating mode. Thus, a voltage level of the reference voltage terminal of the voltage regulator 1401 increases. Accordingly, a voltage level of an output voltage output via an output terminal 1405 in the power saving mode is lower than in the operating mode.

As described above, when the image forming apparatus 200 enters the power saving mode, the transistor 1304 is turned off according to the control signal to switch the voltage level of the output voltage from a first voltage level to a second voltage level that is lower than the first voltage level.

If the image forming apparatus 200 is in the operating mode, the switching unit 130 receives a control signal indicating that indicating that the image forming apparatus 200 enters the operating mode and the transistor 1304 is thus turned on, thereby switching the voltage level of the output voltage from the second voltage level to the first voltage level.

According to the current exemplary embodiment, the transistor 1304 is connected in parallel to the third resistor 1404, but the transistor 1304 may be connected in parallel to a second resistor 1403 connected between the reference voltage terminal of the voltage regulator 1401 and ground. When the transistor 1304 is connected in parallel to the second resistor 1403, the switching unit 130 may perform the same operation as when the transistor 1304 is connected in parallel to the third resistor 1404.

Although FIG. 2B illustrates the transistor 1304 as the PNP transistor, the transistor 1304 may be the NPN transistor. A logic state of the control signal when the NPN transistor is used may be opposite to when the PNP transistor is used.

For example, if the control signal supplied to the switching unit 130 using the PNP transistor is logic low in the operating mode and is logic high in the power saving mode, then the control signal supplied to the switching unit 130 using the NPN transistor may be logic high in the operating mode and may be logic low in the power saving mode.

Figure 3:
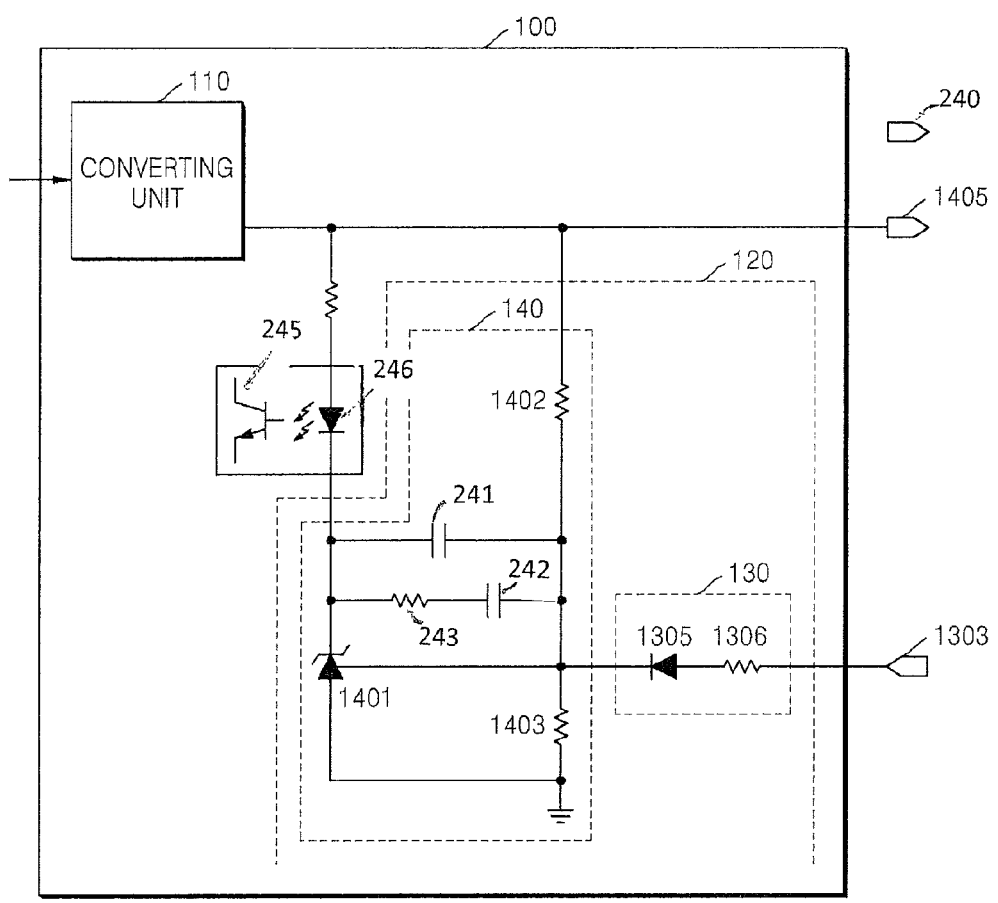
FIG. 3 is a circuit diagram of the voltage controller of FIG. 1, according to another exemplary embodiment of the present general inventive concept.

FIG. 3 is a circuit diagram of the voltage controller 120 of FIG. 1, according to another exemplary embodiment of the present general inventive concept. The voltage controller 120 illustrated in FIG. 3 switches a voltage level of an output voltage differently from the switching unit 130 illustrated in FIGS. 2A and 2B. FIG. 3 also illustrates a terminal 240, capacitors 241, 242, resistors 243, 244, transistor 245, and diode 246.

Referring to FIG. 3, the voltage controller 120 includes the switching unit 130 and the voltage stabilizer 140. The voltage controller 120 of FIG. 3 corresponds to the voltage controller 120 of FIGS. 2A and 2B, and the switching unit 130 and the voltage stabilizer 140 of FIG. 3 respectively correspond to the switching unit 130 and the voltage stabilizer 140 of FIGS. 2A and 2B.

Referring to FIG. 3, the switching unit 130 includes a diode 1305 and a resistor B 1306, and the voltage stabilizer 140 includes the voltage regulator 1401, the first resistor 1402, and the second resistor 1403. Also, the switching unit 130 may further include the input terminal 1303 to receive a control signal from the system controller 210, and the voltage stabilizer 140 may further include the output terminal 1405 to output an output voltage to the system controller 210.

Similar to the voltage controller 120 of FIGS. 2A and 2B, the voltage controller 120 of FIG. 3 outputs an output voltage adjusted by the switching unit 130 and the voltage stabilizer 140.

Similar to the voltage stabilizer 140 of FIGS. 2A and 2B, the voltage stabilizer 140 of FIG. 3 is connected to a secondary coil of a transformer, and controls the voltage level of the output voltage to be maintained constant. The above descriptions regarding the voltage stabilizer 140 in FIGS. 2A and 2B may also be applied to the voltage stabilizer 140 of FIG. 3.

The switching unit 130 of FIG. 3 switches the voltage level of the output voltage differently from the switching unit 130 of FIG. 2. The switching unit 130 of FIG. 3 includes the diode 1305 and the resistor B 1306.

In FIG. 3, the diode 1305 is connected to the reference voltage terminal of the voltage regulator 1401, and the resistor B 1306 is connected in series to the diode 1305. Accordingly, the diode 1305 is turned on and/or off based on the control signal received from the system controller 210 via the input terminal 1303.

If a voltage of an anode of the diode 1305 is higher than that of a cathode of the diode 1305, the diode 1305 is turned on and current flows in a forward direction. Accordingly, the diode 1305 illustrated in FIG. 3 is tuned on when a control signal received via the input terminal 1303 is logic high, and is turned off when the control signal received via the input terminal 1303 is a logic low.

According to the current exemplary embodiment, if the image forming apparatus 200 enters a power saving mode, the switching unit 130 receives a logic high signal from the system controller 210 and is turned on. On the other hand, if the image forming apparatus 200 is in an operating mode, the switching unit 130 receives a logic low signal from the system controller 210 and is turned off.

If the switching unit 130 is turned on in the power saving mode, current flows through the diode 1305 and the resistor B 1306 connected in series to the diode 1305, and the current flowing through the switching unit 130 is supplied to a reference voltage terminal of the voltage regulator 1401.

In the voltage stabilizer 140, an amount of current from the reference voltage terminal of the voltage regulator 1401 to ground is constant. Accordingly, if current flows into the reference voltage terminal of the voltage regulator 1401 from the switching unit 130, the amount of current flowing through the first resistor 1402 of the voltage stabilizer 140 is reduced.

The first resistor 1402 and the second resistor 1403 according to the current exemplary embodiment have fixed resistance values. Accordingly, the amount of a voltage of the first resistor 1402 is reduced and a voltage level of an output voltage output via the output terminal 1405 is also lowered. As described above, an output voltage output via the output terminal 1405 when the image forming apparatus 200 is in the power saving mode is lower than when the image forming apparatus 200 is in the operating mode.

When the image forming apparatus 200 enters the power saving mode, the switching unit 130 turns on the diode 1305 to switch the voltage level of the output voltage from a first voltage level to a second voltage level that is lower than the first voltage level, based on the control signal received from the system controller 210.

When the image forming apparatus 200 is in the operating mode, the switching unit 130 receives a logic low signal as a control signal from the system controller 210, and turns off the diode 1305 to switch the voltage level of the output voltage from the second voltage level to the first voltage level.

Accordingly, the second voltage level of the output voltage switched when the diode 1305 is turned on and/or off is determined according to a resistor value of the resistor B 1306 and a voltage level of the control signal input via the input terminal 1303. As such, the second voltage level to minimize power consumption in the power saving mode may be determined by changing a resistance value of the resistor B 1306 or the voltage level of the control signal.

For example, if the resistance value of the resistor B 1306 is increased, the amount of current supplied to the reference voltage terminal of the voltage regulator 1401 is reduced. As such, the amount of voltage drop across the first resistor 1402 is reduced, and the second voltage level of the voltage output in the power saving mode is increased. In contrast, if the resistance value of the resistor B 1306 is reduced, the amount of current supplied to the reference voltage terminal of the voltage regulator 1401 is increased. As such, the amount of voltage drop across the first resistor 1402 is increased, and the second voltage level of the voltage output in the power saving mode is increased.

As such, the system controller 210 may determine the resistance value of the resistor B 1306 as a resistance value to minimize power consumption in the power saving mode. The voltage level of the output voltage obtained according to the determined resistance value may be the second voltage level.

According to an exemplary embodiment of the present general inventive concept, the system controller 210 may change the resistance value of the resistor B 1306 by using a variable resistor that may change its resistance value.

As another example, the second voltage level to minimize power consumption in the power saving mode may be determined by changing the voltage level of the control signal.

If the voltage level of the control signal is increased, the amount of current supplied to the reference voltage terminal of the voltage regulator 1401 is increased. As such, the amount of voltage drop across the first resistor 1402 is increased, and the second voltage level of the output voltage output in the power saving mode is reduced. On the other hand, if the voltage level of the control signal is reduced, the amount of current supplied to the reference voltage terminal of the voltage regulator 1401 is reduced. As such, the amount of voltage drop across the first resistor 1402 is reduced, and the second voltage level of the output voltage output in the power saving mode is increased.

Accordingly, the system controller 210 may determine the voltage level of the control signal as a voltage value to minimize power consumption in the power saving mode from among voltage values set as the voltage level of the control signal. The determined voltage level may be the second voltage level.

According to an exemplary embodiment of the present general inventive concept, the system controller 210 may change the voltage level of the control signal by using a digital-analog converter 211 of the system controller 210. In other words, by setting the voltage level of the control signal as a voltage value converted by the digital-analog converter 211, the system controller 210 may analogically change the voltage level of the control signal.

As such, the system controller 210 may determine the voltage level of the control signal as a voltage value to minimize power consumption in the power saving mode from among voltage values converted by the digital-analog converter 211, and may determine the determined voltage level as the second voltage level.

Therefore, the SMPS 100 according to the current exemplary embodiment may determine the second voltage level to minimize power consumption in the image forming apparatus 200 in the power saving mode, by allowing the system controller 210 to change the resistance value of the switching unit 130 or the voltage level of the control signal input to the switching unit 130.

For example, the image forming apparatus 200 may convert the second voltage level to a voltage value required to drive the system controller 210 by using a DC/DC converter, and may provide the converted voltage value to the system controller 210. The image forming apparatus 200 may determine the resistance value of the switching unit 130 to minimize power consumption in the power saving mode by using the system controller 210, and the SMPS 100 outputs the second voltage level according to the determined resistance value as the voltage output. As such, the image forming apparatus 200 may minimize power consumption in the power saving mode including power loss according to the conversion of the DC/DC converter. That is, the SMPS 100 according to the current exemplary embodiment may efficiently reduce power consumption.

Figure 4A:
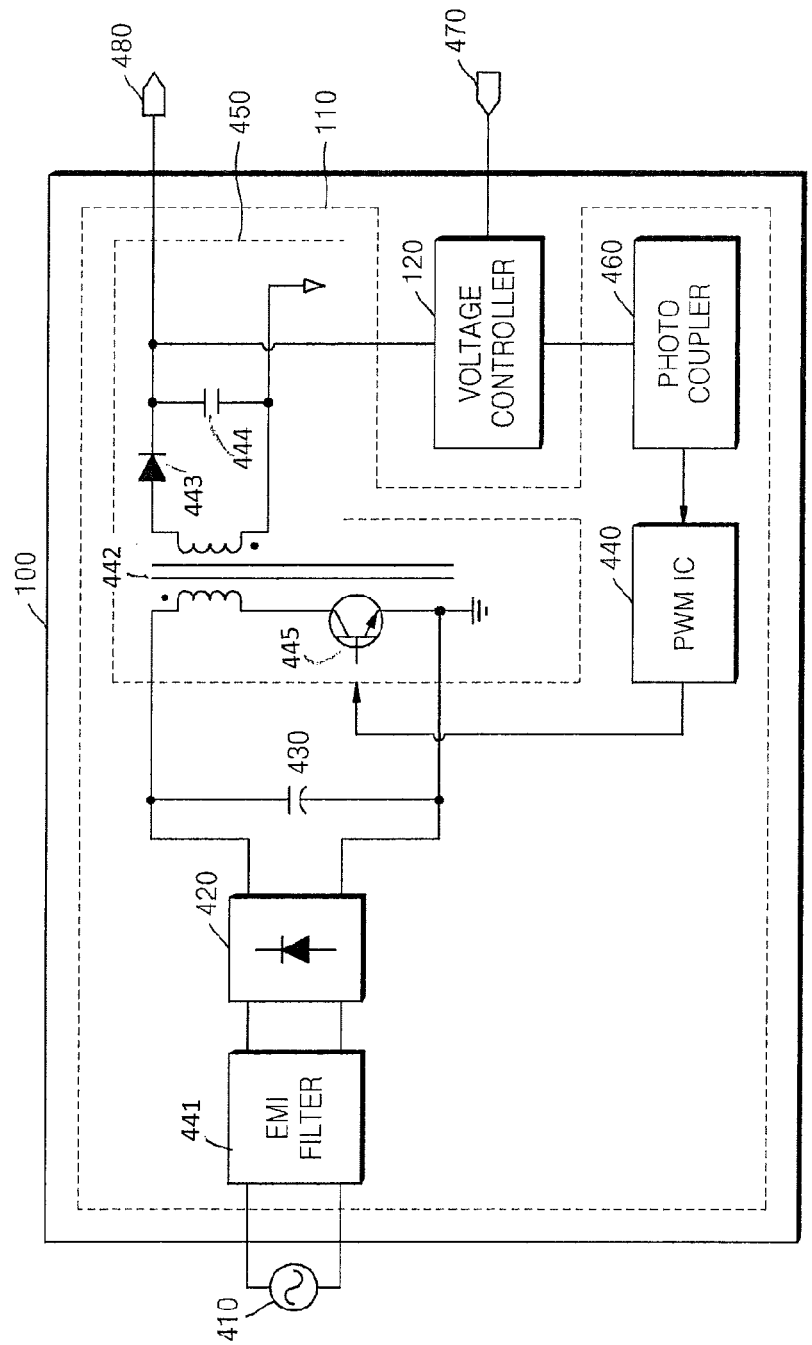
FIG. 4A is a circuit diagram of an SMPS with a voltage controller, according to an exemplary embodiment of the present general inventive concept.
Figure 4B:
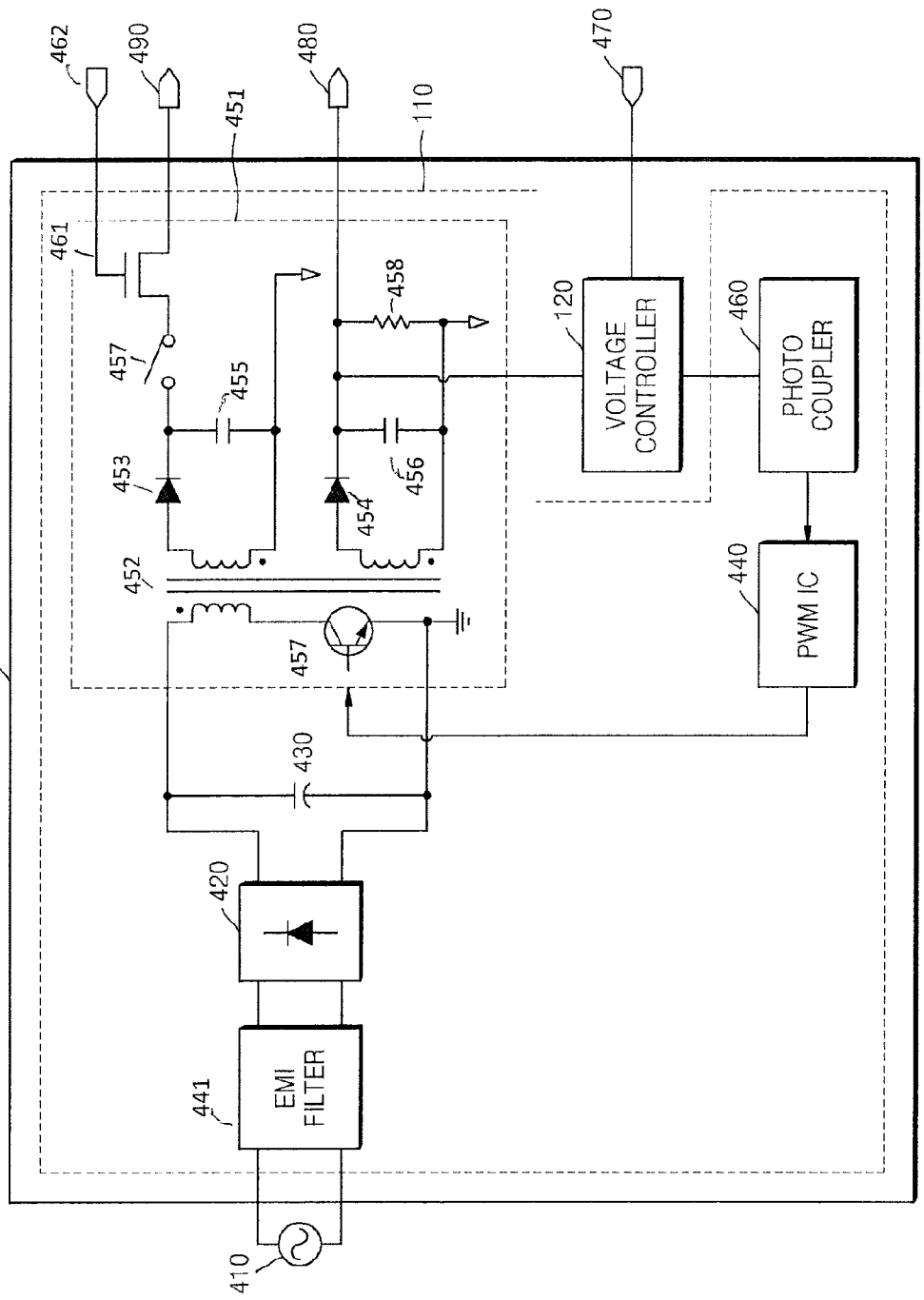
FIG. 4B is a circuit diagram of an SMPS with a voltage controller, according to another exemplary embodiment of the present general inventive concept.
Figure 4C:
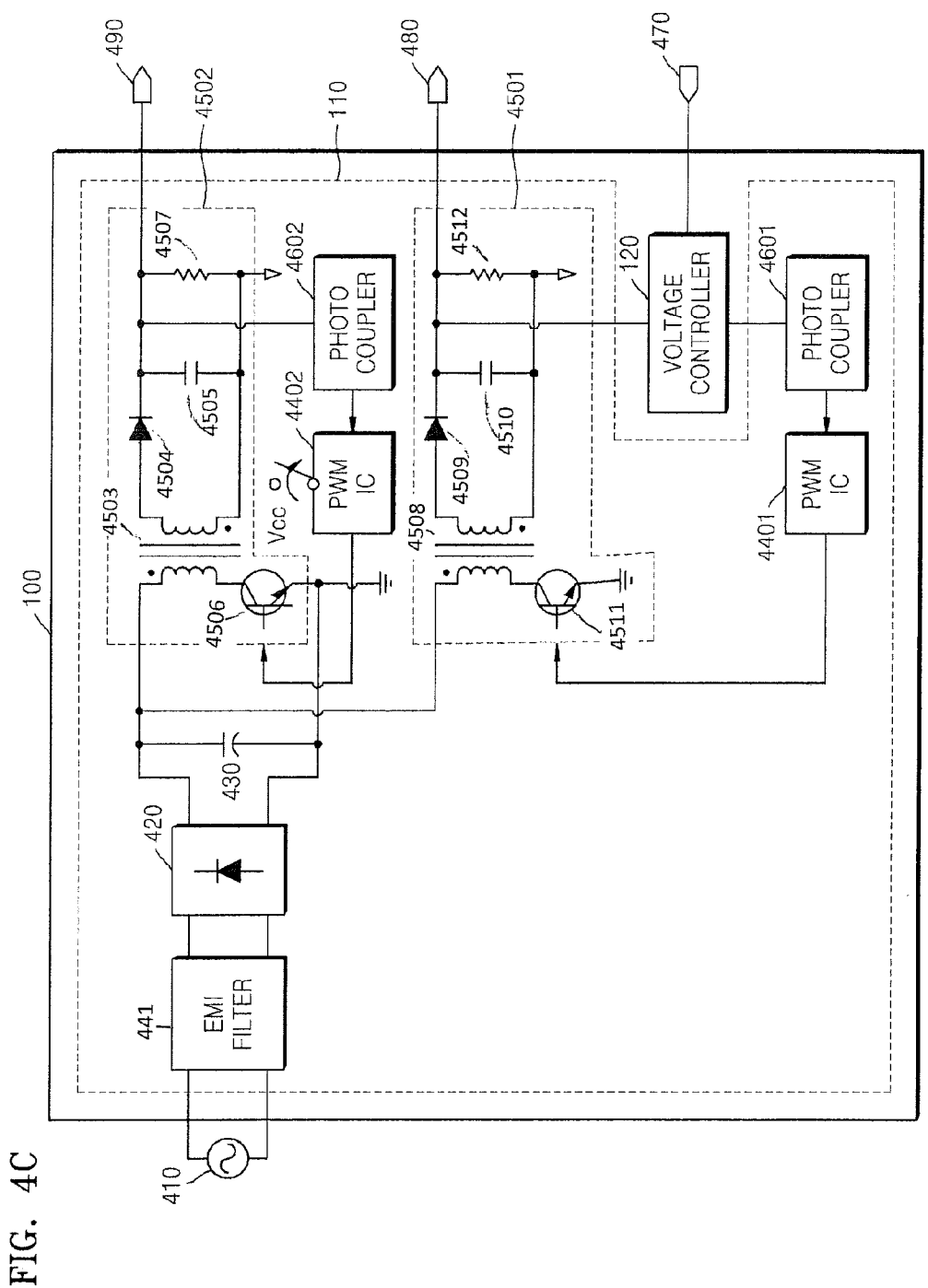
FIG. 4C is a circuit diagram of an SMPS with a voltage controller, according to another exemplary embodiment of the present general inventive concept.

FIGS. 4A through 4C are circuit diagrams of an SMPS 100 with a voltage controller 120, according to various exemplary embodiments of the present general inventive concept. Referring to FIGS. 4A through 4C, the SMPS 100 includes a converting unit 110 and the voltage controller 120. The converting unit 110 and the voltage controller 120 illustrated in FIGS. 4A through 4C are respectively the same as the converting unit 110 and the voltage controller 120 of FIG. 1, and will thus not be described again here.

Specifically, FIG. 4A illustrates a single-output where the SMPS 100 outputs only one output voltage to the image forming apparatus 200. Referring to FIG. 4A, the SMPS 100 includes the converting unit 110 and the voltage controller 120, and the converting unit 110 includes a rectifier device 420, a smoothing device 430, a switching controller 440, a transformer 450, and a photo coupler 460. The voltage controller 120 may include an input terminal 470 to receive a control signal indicating a state of the image forming apparatus 200. The converting unit 110 may further include an output terminal 480 to output an output voltage.

As described above with reference to FIG. 1, the converting unit 110 converts an AC voltage 410 applied to the SMPS 100 to at least one DC voltage by using at least one transformer 450.

The rectifier device 420 rectifies the AC voltage 410 applied to the converting unit 110. For example, the rectifier device 420 may be embodied as a diode-based bridge circuit, but is not limited thereto.

The smoothing device 430 smoothes the rectified voltage. For example, the smoothing device 430 may be a capacitor, but is not limited thereto.

The switching controller 440 controls switching to apply the rectified voltage to the transformer 450. According to an exemplary embodiment of the present general inventive concept, the switching controller 440 may be embodied as a pulse-width modulated integrated circuit (PWM IC) but is not limited thereto.

The transformer 450 of FIG. 4A converts a primary coil voltage which is controlled by the switching controller 440 by using the rectified voltage to a secondary coil voltage. Referring to FIG. 4A, one converted voltage is output from the transformer 450. For example, the transformer 450 of FIG. 4A may output a DC voltage of 24 V. It may be assumed that the transformer 450 of FIG. 4A outputs a DC voltage of 24V. FIG. 4A also illustrate EMI filter 441, and transformer 450 including core 442, diode 443, capacitor 444 and transistor 445.

As described above with reference to FIG. 1, the voltage controller 120 may control the DC voltage to maintain a constant and stable voltage level so that the SMPS 100 may output a constant and stable output voltage. Thus, the output terminal 480 may apply a constant and stable output voltage of 24 V to the image forming apparatus 200.

More specifically, the voltage controller 120 adjusts an amount of current to be supplied to the photo coupler 460 according to the voltage level of the output voltage that is a secondary coil voltage of the transformer 450. Accordingly, although not illustrated, a light emitting unit of the photo coupler 460 is connected to the voltage controller 120 to be connected to a secondary coil of the transformer 450, and a light receiving unit of the photo coupler 460 is connected to the switching controller 440 connected to a primary coil of the transformer 450 to control switching of a voltage of the primary coil of the transformer 450. Thus, the voltage controller 120 may control the voltage level of the output voltage to be maintained at a constant level.

With respect to a single-output, the image forming apparatus 200 forms an image and controls overall operations of the image forming apparatus 200 by using the output voltage of 24V. However, if the SMPS 100 continuously were to apply 24 V to the image forming apparatus 200 even when the image forming apparatus 200 enters the power saving mode, unnecessary power consumption would occur, thus increasing a power loss. Thus, power efficiency would be degraded.

Thus, according to an exemplary embodiment of the present general inventive concept, when the image forming apparatus 200 enters the power saving mode, the voltage controller 120 receives a control signal via the input terminal 470, and switches the voltage level of the output voltage from the first voltage level to a second voltage level that is lower than the first voltage level.

In other words, when the image forming apparatus 200 enters the power saving mode, the SMPS 100 may reduce the output voltage from 24 V to 21.6 V. Thus, when the image forming apparatus 200 is in the power saving mode, the SMPS 100 does not apply unnecessary power to the image forming apparatus 200, thereby increasing the power efficiency of the image forming apparatus 200.

FIG. 4B illustrates a multi-output where the SMPS 100 applies a plurality of output voltages to the image forming apparatus 200. Referring to FIG. 4B, the SMPS 100 includes the converting unit 110 and the voltage controller 120. The converting unit 110 includes a rectifier device 420, a smoothing device 430, a switching controller 440, a transformer 451, and a photo coupler 460. The voltage controller 120 may include an input terminal 470 to receive a control signal indicating a state of the image forming apparatus 200. The converting unit 110 may further include a first output terminal 480 to output a voltage to the system controller 210, and a second output terminal 490 to output a voltage to the image forming unit 220.

The rectifier device 420, the smoothing device 430, the switching controller 440, and the photo coupler 460 of FIG. 4B are respectively the same as the rectifier device 420, the smoothing device 430, the switching controller 440, and the photo coupler 460 of FIG. 4A, and are thus not described again here.

The transformer 450 of FIG. 4A converts a primary coil voltage to a secondary coil voltage, whereas the transformer 451 of FIG. 4B converts the primary coil to two secondary coil voltages. The transformer 451 of FIG. 4B may convert a primary coil voltage to a plurality of secondary coil voltages by adjusting a coil winding form of the transformer. For example, the transformer 451 of FIG. 4B may output two DC voltages as the plurality of secondary coil voltages, e.g., 24 V and 5 V. It may be assumed that the transformer 451 of FIG. 4B outputs two DC voltages of 24V and 5V. FIG. 4B also illustrates EMI filter 441, and transformer 451 including core 452, diodes 453, 454, capacitors 455, 456, 461, transistor 457, resistor 458, switch 459, and terminal 462.

With respect to a multi-output, 24 V may be used to drive the image forming unit 220 to form an image, and 5 V may be used to drive the system controller 210 to control overall operations of the image forming apparatus 200. It may be assumed that a multi-output may include a voltage applied to the system controller 210 as a first output voltage and a voltage applied to the image forming unit 220 as a second output voltage.

If the image forming apparatus 200 is in the operating mode, the SMPS 100 outputs the first output voltage, i.e., an output voltage of 5 V, to the system controller 210 via the first output terminal 480, and outputs the second output voltage, i.e., an output voltage of 24 V, to the image forming unit 220 via the second output terminal 490.

If the image forming apparatus 200 enters the power saving mode, the SMPS 100 opens a switch which connects a secondary coil of the transformer 450 to the second output terminal 490 to cut off a voltage from the secondary coil. Thus, the SMPS 100 may prevent 24 V from being applied to the image forming unit 220, in the power saving mode.

If the image forming apparatus 200 enters the power saving mode, the voltage controller 120 receives a control signal via the input terminal 470, and switches the voltage level of the first output voltage, which is to be output to the system controller 210, from a first voltage level to a second voltage level that is lower than the first voltage level. For example, when the image forming apparatus 200 is in the power saving mode, the voltage controller 120 switches the first output voltage from 5 V to 4 V, and outputs the 4 V to the system controller 210 via the first output terminal 480.

Thus, when the image forming apparatus 200 is in the power saving mode, the SMPS 100 outputs only the first output voltage, i.e., 4 V, to the system controller 210. In the power saving mode, the image forming apparatus 200 blocks the second output voltage, i.e., 24 V, to be output to the image forming unit 220, thereby reducing power consumption. Furthermore, the SMPS 100 according to an exemplary embodiment of the present general inventive concept may switch the first output voltage from 5 V to 4 V, and apply an output voltage, which is lower than in the operating mode, to the system controller 210, thereby more efficiently reducing power consumption.

Accordingly, if the image forming apparatus 200 is in the power saving mode, the SMPS 100 switches the voltage level of the first output voltage to a minimum voltage level required to operate the image forming apparatus 200 in the power saving mode and applies the minimum voltage level to the image forming apparatus 200 as the first output voltage, thereby maximizing power efficiency.

FIG. 4C illustrates a multi-output case where the SMPS 100 outputs a plurality of output voltages to the image forming apparatus 200 by using a plurality of transformers. Referring to FIG. 4C, the SMPS 100 includes the converting unit 110 and the voltage controller 120. The converting unit 110 includes a rectifier device 420, a smoothing device 430, a first switching controller 4401, a second switching controller 4402, a first transformer 4501, a second transformer 4502, a first photo coupler 4601, and a second photo coupler 4602. The voltage controller 120 may include an input terminal 470 to receive a control signal indicating a state of the image forming apparatus 200. The converting unit 110 may further include a first output terminal 480 to output a voltage to the system controller 210, and a second output terminal 490 to output a voltage to the image forming unit 220.

The rectifier device 420 and the smoothing device 430 of FIG. 4C are respectively the same as the rectifier device 420 and the smoothing device 430 of FIG. 4A, and thus are not described again here.

Referring to FIG. 4C, unlike in FIGS. 4A and 4B, the converting unit 110 uses the two transformers 4501 and 4502 to convert a primary coil voltage to two secondary coil voltages. Accordingly, the converting unit 110 includes the first switching controller 4401, the second switching controller 4402, the first transformer 4501, the second transformer 4502, the first photo coupler 4601, and the second photo coupler 4602.

Each of the first transformer 4501 and the second transformer 4502 converts the primary coil voltage to a secondary coil voltage according to a number of turns of a winding coil thereon. In other words, the first transformer 4501 and the second transformer 4502 convert the same primary coil voltage to two secondary coil voltages, e.g., two DC voltages, respectively, and thus, the converting unit 110 may output the two DC voltages. A DC voltage output from the first transformer 4501 is used as a first output voltage to be applied to the system controller 210. For example, the first transformer 4501 may output a DC voltage of 5 V. It may be assumed that the first transformer 4501 outputs a DC voltage of 5V. FIG. 4C also illustrates EMI filter 441, first transformer 4501 including core 4503, diode 4504, capacitor 4505, transistor 4506, and resistor 4507, and second transformer 4502 including core 4508, diode 4509, capacitor 4510, transistor 4511, and resistor 4512.

The voltage controller 120 controls the voltage level of the DC voltage output from the first transformer 4501 and then outputs the controlled DC voltage as the first output voltage.

More specifically, the voltage controller 120 adjusts an amount of current to be supplied to the first photo coupler 4601 according to the voltage level of the secondary coil voltage of the first transformer 4501. Accordingly, although not illustrated, a light emitting unit of the first photo coupler 4601 is connected to the voltage controller 120 to be connected to a secondary coil of the first transformer 4501, and a light receiving unit of the first photo coupler 4601 is connected to the first switching controller 4401 connected to a primary coil of the first transformer 4501 to control switching of a voltage of the primary coil of the first transformer 4501. Thus, the voltage controller 120 may control the voltage level of the first output voltage to be maintained at a constant level.

ADC voltage output from the second transformer 4502 is used as a second output voltage to be applied to the image forming unit 220. For example, the transformer 4502 may output a DC voltage of 24 V. It may be assumed that the second transformer 4502 outputs a DC voltage of 24V.

An amount of current that is to be supplied to the second photo coupler 4602 is adjusted according to the voltage level of the DC voltage output from the second transformer 4502. The second switching controller 4402 is connected to the light receiving unit of the second photo coupler 4602 to control switching of a voltage of the primary coil of the second transformer 4502. A switching device may be connected between a VCC terminal that applies a power supply voltage Vcc to the second switching controller 4402 and the second switching controller 4402. Thus, the second switching controller 4402 is activated according to turning on or turning off of the switching device. When the image forming apparatus 200 enters the power saving mode, the switching device may be opened so that the power supply voltage Vcc is not applied to the second switching controller 4402.

When the image forming apparatus 200 is in the operating mode, the SMPS 100 outputs an first output voltage of 5 V to the system controller 210 via the first output terminal 480 connected to the secondary coil of the first transformer 4501, and outputs an second output voltage of 24 V to the image forming unit 220 via the second output terminal 490 connected to the secondary coil of the second transformer 4502.

When the image forming apparatus 200 enters the power saving mode, the SMPS 100 opens the switching device connected to the second switching controller to block the second output voltage as described above. Also, the voltage controller 120 receives a control signal via the input terminal 470, and switches the voltage level of the first output voltage, which is to be output to the system controller 210, from a first voltage level to a second voltage level that is lower than the first voltage level.

Thus, when the image forming apparatus 200 is in the power saving mode, the SMPS 100 blocks the second output voltage of 24 V to be output to the image forming unit 220, and outputs the first output voltage of 4 V, which is lower than 5 V, which is output as the first output voltage in the operating mode.

As described above, when the image forming apparatus 200 enters the power saving mode, the SMPS 100 according to an exemplary embodiment of the present general inventive concept outputs a lower voltage level of the first output voltage than that in the operating mode, thereby effectively improving power efficiency in the power saving mode.

FIG. 5 is a block diagram of an image forming apparatus 200 with an SMPS 100, according to another exemplary embodiment of the present general inventive concept. Referring to FIG. 5, the image forming apparatus 200 includes the SMPS 100, a system controller 210, an image forming unit 220, a fax unit 230, a transmission performing unit 240, a communication interface unit 250, a user interface unit 260, and a storage unit 270.

FIG. 5 illustrates selected main components of the image forming apparatus 200 related to the current exemplary embodiment. However, the image forming apparatus 200 may further include other general components.

Since the SMPS 100 performs the same operations as the SMPS 100 described above with reference to FIGS. 1 through 4, the descriptions with respect to FIGS. 1 through 4 may also be applied to the SMPS 100 of FIG. 5.

Referring to FIG. 5, the SMPS 100 converts an AC voltage input thereto to at least one DC voltage by using at least one transformer, switches a voltage level of an output voltage, which is output to the system controller 210 from among the at least one DC voltage, to a first voltage level or a second voltage level that is lower than the first voltage level, based on a control signal received from the system controller 210, and then outputs the switched output voltage to the system controller 210.

When the image forming apparatus 200 enters the power saving mode, the SMPS 100 switches the voltage level of the output voltage, which is to be output to the system controller 210, from the first voltage level to the second voltage level.

With respect to a single-output, the SMPS 100 may output, for example, 24 V as an output voltage in the operating mode. The output voltage, i.e., 24 V, which is output from the SMPS 100 may be converted by using a DC/DC converter (not illustrated) to a voltage to be used in each element of the image forming apparatus 200, and then may be applied to each element of the image forming apparatus 200. Accordingly, if the image forming apparatus 200 enters the power saving mode, the SMPS 100 outputs an output voltage that is lower than in the operating mode so as to reduce unnecessary power consumption. Thus, the voltage level of the output voltage is switched from 24 V to 21.6 V and the 21.6 V is then output as the output voltage.

With respect to a multi-output, the SMPS 100 may output, for example, 5 V and 24 V in the operating mode. 24 V may be used to form an image in the image forming unit 220 of the image forming apparatus 200. 24 V is applied to not only the image forming unit 220 but also to other elements of the image forming apparatus 200 that perform various functions of the image forming apparatus 200. 5 V may be used to drive the system controller 210 that controls an entire system of the image forming apparatus 200.

When the image forming apparatus 200 enters the power saving mode, the SMPS 100 blocks 24 V which is output to the image forming unit 220. Also, the SMPS 100 switches 5 V, which is to be output to the system controller 210, to 4 V. Thus, the SMPS 100 may apply a minimum voltage required to operate the image forming apparatus 200 in the power saving mode to the image forming apparatus 200, thereby increasing the power efficiency of the image forming apparatus 200.

The system controller 210 may be operated with an output voltage of the SMPS 100 (i.e., the first output voltage of 5 V in the case of a multi-output), and outputs a control signal to control a switching operation of the SMPS 100.

Thus, when the image forming apparatus 200 is in the power saving mode, the SMPS 100 switches a voltage level of an output voltage from the first voltage level to the second voltage level that is lower than the first voltage level, based on the control signal received from the system controller 210.

Thus, regardless of a single-output or a multi-output, the SMPS 100 may output a first voltage level of an output voltage, which is lower than a second voltage level of an output voltage output in the operating mode, to the system controller 210, thereby minimizing power consumption in the image forming apparatus 200.

The image forming unit 220 may be operated with an output voltage of the SMPS 100 (i.e., the second output voltage of 24 V in the case of a multi-output), and performs an operation to form an image corresponding to print data.

The facsimile unit 230 performs fax transmission corresponding to fax data according to fax functions of the image forming apparatus 200.

The transmission performing unit 240 transmits a document to an external device, e.g., a server, a mobile storage medium, or a computer system.

The communication interface unit 250 performs data transmission according to communication functions of the image forming apparatus 200. Examples of the communication interface unit 250 include a modem to receive or transmit data, a network module to access a network, a universal serial bus (USB) and host module to form a data transmission channel with a mobile storage medium.

The user interface unit 260 receives an input signal from a user and displays information so that the user can view it. Examples of the user interface unit 260 may include various input/output (I/O) devices equipped with the image forming apparatus 200, e.g., a display panel, a mouse, a keyboard, a touch screen, a monitor, a speaker, etc., but is not limited thereto.

The storage unit 270 stores data, print data, scan data, fax data, etc., which is generated during an operation of the image forming apparatus 200.

Figure 6:
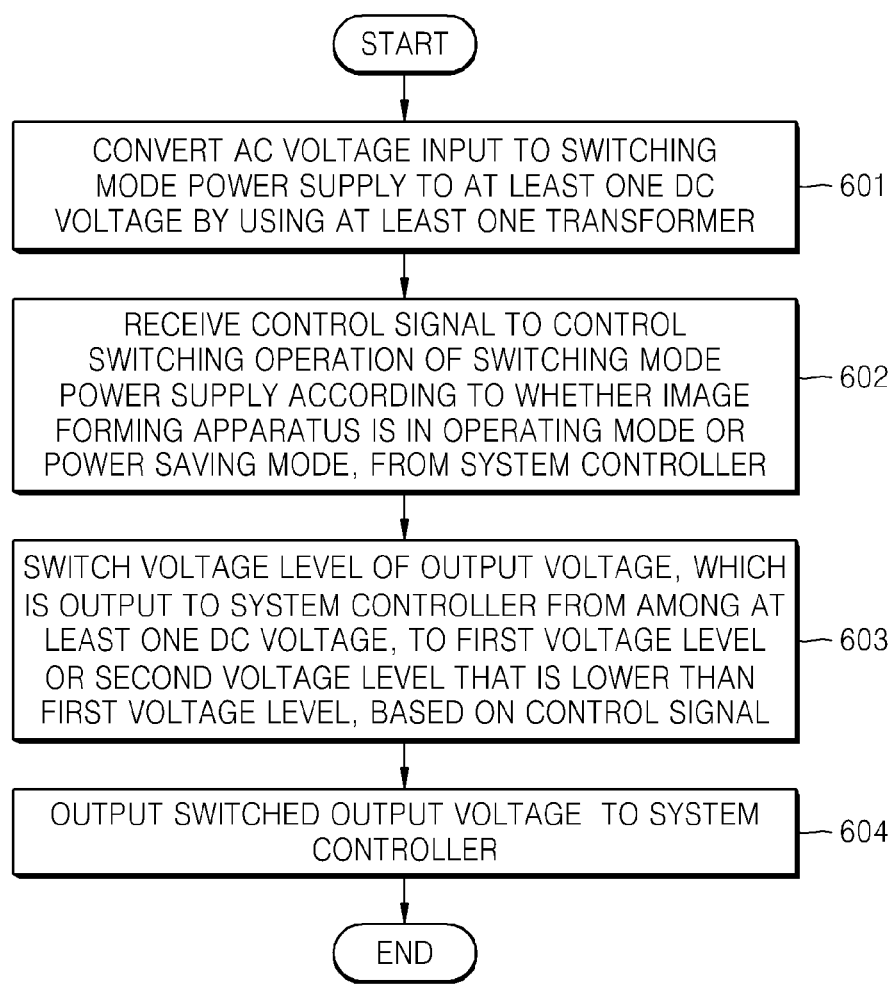
FIG. 6 is a flowchart illustrating a method of supplying power to an image forming apparatus by using an SMPS, according to an exemplary embodiment of the present general inventive concept.

FIG. 6 is a flowchart illustrating a method of supplying power to an image forming apparatus by using an SMPS, according to an exemplary embodiment of the present general inventive concept. The method of FIG. 6 includes operations performed sequentially by the SMPS 100 and the image forming apparatus 200 illustrated in FIGS. 1 through 5. Thus, although not described here, the above descriptions regarding the SMPS 100 and the image forming apparatus 200 with reference to FIGS. 1 through 5 may also be applied to the method of FIG. 6.

In operation 601, the converting unit 110 converts an AC voltage input to the SMPS 100 to at least one DC voltage by using at least one transformer.

In operation 602, the switching unit 130 receives a control signal to control a switching operation of the SMPS 100 according to whether the image forming apparatus 200 is in the operating mode or the power saving mode, from the system controller 210 that controls overall operations of the image forming apparatus 200.

In operation 603, the switching unit 130 switches a voltage level of an output voltage, which is output to the system controller 210 from among the at least one DC voltage, to a first voltage level or a second voltage level that is lower than the first voltage level, based on the control signal.

In operation 604, the SMPS 100 applies the switching output voltage to the system controller 210.

Thus, when the image forming apparatus 200 enters the power saving mode, the SMPS 100 may output a second voltage level as an output voltage to be output to the system controller 210, which is lower than the first voltage level output in the operating mode.

For example, with respect to a single-output, if the SMPS 100 outputs a single output voltage, e.g., 24 V, in the operating mode, the output voltage is switched to 21.6 V when the image forming apparatus 200 enters the power saving mode.

With respect to a multi-output, in the operating mode, the SMPS 100 applies 24 V and 5 V to the image forming unit 220 and the system controller 210, respectively. When the image forming apparatus 200 enters the power saving mode, the SMPS 100 blocks 24 V which is output to the image forming unit 220, switches 5 V to 4 V, and applies the 4 V to the system controller 210.

Accordingly, according to an exemplary embodiment of the present general inventive concept, in the power saving mode, the SMPS 100 may switch a voltage level of an output voltage to a minimum voltage level required in the system, thereby minimizing power consumption and maximizing power efficiency.

According to the one or more exemplary embodiments of the present general inventive concept, when an image forming apparatus that includes an SMPS is in a power saving mode, the SMPS minimizes an output voltage, thereby minimizing power consumption in the image forming apparatus. Thus, the power efficiency of the image forming apparatus may be improved.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus comprising a switching mode power supply and a system controller, the switching mode power supply comprising:
    a converting unit to convert an alternating current (AC) voltage input to the switching mode power supply to at least one direct current (DC) voltage by using at least one transformer; and
    a voltage controller to control a voltage level of an output voltage to be output to the system controller of the image forming apparatus from among the at least one DC voltage, where the system controller controls operations of the image forming apparatus,
    wherein the voltage controller comprises a switching unit to switch the voltage level of the output voltage from a first voltage level to a second voltage level based on a control signal received from the system controller of the image forming apparatus when the image forming apparatus enters a power saving mode, where the second voltage level is lower than the first voltage level,
    wherein the second voltage level is determined according to a voltage level of the control signal and the voltage level of the control signal is a voltage value converted by a digital-analog converter of the system controller.

2. The image forming apparatus of claim 1, wherein the voltage controller is connected to a secondary coil of the at least one transformer so as to control the voltage level of the output voltage.

3. The image forming apparatus of claim 1, the voltage controller further comprises a voltage stabilizer including a voltage regulator connected in parallel to an output terminal to output the output voltage, and at least one resistor connected to a reference voltage terminal of the voltage regulator,
    wherein the switching unit is connected to the reference voltage terminal of the voltage regulator, and
    wherein the switching unit comprises a diode that is turned on or off based on a voltage of the control signal received from the system controller; and
    at least one resistor connected in series to the diode.

4. The image forming apparatus of claim 1, wherein the system controller determines the voltage level of the control signal as a voltage value to minimize power consumption in the power saving mode from among voltage values converted by the digital-analog converter.

5. The image forming apparatus of claim 1, the voltage controller further comprises a voltage stabilizer including a voltage regulator connected in parallel to an output terminal to output the output voltage, and at least one resistor connected to a reference voltage terminal of the voltage regulator, and
    wherein the switching unit comprises a transistor that is turned on or off based on the control signal received from the system controller.

6. The image forming apparatus of claim 1, wherein the converting unit converts the AC voltage input to the switching mode power supply to a DC voltage and then outputs the DC voltage as the output voltage, and
    the output voltage is output to the image forming apparatus, including the system controller.

7. The image forming apparatus of claim 1, wherein the converting unit converts the AC voltage input to the switching mode power supply to a first output voltage and a second output voltage,
    wherein the voltage controller controls a voltage level of the first output voltage, and switches the voltage level of the first output voltage from the first voltage level to the second voltage level when the image forming apparatus enters the power saving mode, and
    the first output voltage and the second output voltage are output to the system controller and an image forming unit of the image forming apparatus, respectively.

8. The image forming apparatus of claim 3, wherein the switching unit is turned on to switch the voltage level of the output voltage to the second voltage level, based on the control signal received from the system controller, when the image forming apparatus enters the power saving mode.

9. The image forming apparatus of claim 3, wherein the second voltage level is determined according to a resistance value of the at least one resistor.

10. The image forming apparatus switching mode power supply of claim 5, wherein the switching unit is connected in parallel to the at least one resistor connected between the reference voltage terminal of the voltage regulator and the output terminal.

11. The image forming apparatus of claim 5, wherein the switching unit is connected in parallel to at least one series resistor connected between the reference voltage terminal of the voltage regulator and ground.

12. The image forming apparatus switching mode power supply of claim 10, wherein the switching unit is turned on to switch the voltage level of the output voltage to the second voltage level, according to the control signal received from the system controller, when the image forming apparatus enters the power saving mode.

13. The image forming apparatus of claim 11, wherein the switching unit is turned off to switch the voltage level of the output voltage to the second voltage level, based on the control signal received from the system controller, when the image forming apparatus enters the power saving mode.

14. An image forming apparatus comprising a switching mode power supply and a system controller, the switching mode power supply comprising:
    a converting unit to convert an alternating current (AC) voltage input to the switching mode power supply to at least one direct current (DC) voltage by using at least one transformer; and
    a voltage controller to control a voltage level of an output voltage to be output to a system controller of the image forming apparatus from among the at least one DC voltage, where the system controller controls operations of the image forming apparatus, wherein the voltage controller comprises a switching unit to switch the voltage level of the output voltage from a first voltage level to a second voltage level based on a control signal received from the system controller of the image forming apparatus when the image forming apparatus enters a power saving mode, where the second voltage level is lower than the first voltage level, the voltage controller further comprises a voltage stabilizer including a voltage regulator connected in parallel to an output terminal to output the output voltage, and at least one resistor connected to a reference voltage terminal of the voltage regulator, wherein the switching unit is connected to the reference voltage terminal of the voltage regulator, and wherein the switching unit comprises a diode that is turned on or off based on a voltage of a control signal received from the system controller; and at least one resistor connected in series to the diode, wherein the second voltage level is determined according to a resistance value of the at least one resistor, wherein the at least one resistor is a variable resistor, and wherein the system controller determines the resistance value of the variable resistor as a resistance value to minimize power consumption in the power saving mode from among resistance values of the variable resistor.

15. An image forming apparatus which includes a switching mode power supply, the image forming apparatus comprising:
   a system controller to control operations of the image forming apparatus, and to output a control signal to control a switching operation of the switching mode power supply according to whether the image forming apparatus is in an operating mode or a power saving mode; and
   the switching mode power supply to convert an alternating current (AC) voltage input thereto to at least one direct current (DC) voltage by using at least one transformer, to switch a voltage level of an output voltage, which is output to the system controller from among the at least one DC voltage, to a first voltage level or a second voltage level according to the control signal from the system controller of the image forming apparatus, and then to output the switched output voltage to the system controller, where the second voltage level is lower than the first voltage level,
   wherein the second voltage level is determined according to a voltage level of the control signal and the voltage level of the control signal is a voltage value converted by a digital-analog converter of the system controller.

16. The image forming apparatus of claim 15, wherein, when the image forming apparatus enters the power saving mode, the switching mode power supply switches the voltage level of the output voltage from the first voltage level to the second voltage level.

17. The image forming apparatus of claim 15, wherein the switching mode power supply comprises:
   a voltage stabilizer to stabilize the output voltage by using a voltage regulator connected in parallel to an output terminal to output the output voltage, and at least one resistor connected between a reference voltage terminal of the voltage regulator and the output terminal,
   wherein the switching unit includes a transistor connected in parallel to the at least one resistor, and
   wherein, when the image forming apparatus enters the power saving mode, the switching unit turns on the transistor to switch the voltage level of the output voltage to the second voltage level, based on the control signal.

18. The image forming apparatus of claim 15, wherein the switching mode power supply comprises:
   a voltage stabilizer to stabilize the output voltage by using a voltage regulator connected in parallel to an output terminal to output the output voltage, and at least one resistor connected between a reference voltage terminal of the voltage regulator and ground,
   wherein the switching unit includes a transistor connected in parallel to the at least one resistor, and
   wherein, when the image forming apparatus enters the power saving mode, the switching unit turns off the transistor to switch the voltage level of the output voltage to the second voltage level, based on the control signal.

19. The image forming apparatus of claim 15, wherein the switching mode power supply comprises:
   a voltage stabilizer to stabilize the output voltage by using a voltage regulator connected in parallel to an output terminal to output the output voltage, and at least one resistor connected between a reference voltage terminal of the voltage regulator and the output terminal,
   wherein the switching unit comprises a diode connected to the reference voltage terminal of the voltage regulator; and a resistor connected in series to the diode,
   wherein the switching unit is connected to the reference voltage terminal of the voltage regulator, and
   wherein the switching unit turns on the diode to switch the voltage level of the output voltage to the second voltage level, based on the control signal, when the image forming apparatus enters the power saving mode.

20. A method of supplying power to an image forming apparatus by using a switching mode power supply, the method comprising:
   converting an alternating current (AC) voltage input to the switching mode power supply into at least one direct current (DC) voltage by using at least one transformer;
   receiving a control signal to control a switching operation of the switching mode power supply according to whether the image forming apparatus is in an operating mode or a power saving mode, from a system controller that controls operations of the image forming apparatus;
   switching a voltage level of an output voltage, which is output to the system controller from among the at least one DC voltage, to a first voltage level or a second voltage level, based on the control signal, where the second voltage level is lower than the first voltage level; and
   outputting the switched output voltage to the system controller,
   wherein the second voltage level is determined according to a voltage level of the control signal and the voltage level of the control signal is a voltage value converted by a digital-analog converter of the system controller.

21. The method of claim 20, wherein the switching of the voltage level comprises switching the voltage level of the output voltage from the first voltage level to the second voltage level when the image forming apparatus enters the power saving mode.

22. The method of claim 20, further comprising stabilizing the output voltage by using a voltage regulator and at least one series resistor, where the voltage regulator is connected in parallel to an output terminal to output the output voltage and the at least one series resistor is connected between a reference voltage terminal of the voltage regulator and the output terminal, and wherein the switching of the voltage level comprises switching the voltage level of the output voltage by using a transistor connected in parallel to the at least one series resistor, and turning on the transistor to switch the voltage level of the output voltage to the second voltage level, based on the control signal, when the image forming apparatus enters the power saving mode.

23. The method of claim 20, further comprising stabilizing the output voltage by using a voltage regulator and at least one series resistor, where the voltage regulator is connected in parallel to an output terminal to output the output voltage and the at least one series resistor is connected between a reference voltage terminal of the voltage regulator and ground, and wherein the switching of the voltage level comprises switching the voltage level of the output voltage by using a transistor connected in parallel to the at least one series resistor, and turning off the transistor to switch the voltage level of the output voltage to the second voltage level, based on the control signal, when the image forming apparatus enters the power saving mode.

24. A method of supplying power to an image forming apparatus by using a switching mode power supply, the method comprising:

converting an alternating current (AC) voltage input to the switching mode power supply into at least one direct current (DC) voltage by using at least one transformer;

receiving a control signal to control a switching operation of the switching mode power supply according to whether the image forming apparatus is in an operating mode or a power saving mode, from a system controller that controls operations of the image forming apparatus;

switching a voltage level of an output voltage, which is output to the system controller from among the at least one DC voltage, to a first voltage level or a second voltage level, based on the control signal, where the second voltage level is lower than the first voltage level;

outputting the switched output voltage to the system controller; and stabilizing the output voltage by using a voltage regulator and at least one series resistor, where the voltage regulator is connected in parallel to an output terminal to output the output voltage and the at least one series resistor is connected between a reference voltage terminal of the voltage regulator and ground, and wherein the switching of the voltage level comprises switching the voltage level of the output voltage by using a diode connected to the reference voltage terminal of the voltage regulator; and a resistor connected in series to the diode, and turning off the diode to switch the voltage level of the output voltage to the second voltage level, based on the control signal, when the image forming apparatus enters the power saving mode.

25. A non-transitory computer readable recording medium having embodied thereon a computer program to execute a method of supplying power to an image forming apparatus by using a switching mode power supply, wherein the method comprises:

converting an alternating current (AC) voltage input to the switching mode power supply into at least one direct current (DC) voltage by using at least one transformer;

receiving a control signal to control a switching operation of the switching mode power supply according to whether the image forming apparatus is in an operating mode or a power saving mode, from a system controller that controls operations of the image forming apparatus;

switching a voltage level of an output voltage, which is output to the system controller from among the at least one DC voltage, to a first voltage level or a second voltage level, based on the control signal, where the second voltage level is lower than the first voltage level; and outputting the switched output voltage to the system controller, wherein the second voltage level is determined according to a voltage level of the control signal and the voltage level of the control signal is a voltage value converted by a digital-analog converter of the system controller.

26. A switching mode power supply of an image forming apparatus, the switching mode power supply comprising:

a converting unit to convert an alternating current (AC) voltage input to the switching mode power supply to at least one direct current (DC) voltage by using at least one transformer; and a voltage controller to control a voltage level of an output voltage to be output to a system controller of the image forming apparatus from among the at least one DC voltage, where the system controller controls operations of the image forming apparatus, wherein the voltage controller comprises a switching unit to switch the voltage level of the output voltage from a first voltage level to a second voltage level based on a control signal received from the system controller of the image forming apparatus when the image forming apparatus enters a power saving mode, where the second voltage level is lower than the first voltage level and the control signal indicates that the image forming apparatus enters the power saving mode, wherein the second voltage level is determined according to a voltage level of the control signal and the voltage level of the control signal is a voltage value converted by a digital-analog converter of the system controller.

* * * * *